Feb. 6, 1951     H. A. STINE     2,540,557
MECHANISM FOR PACKAGING CHEESE
AND OTHER VISCOUS MATERIALS
Filed Oct. 18, 1947     6 Sheets-Sheet 1
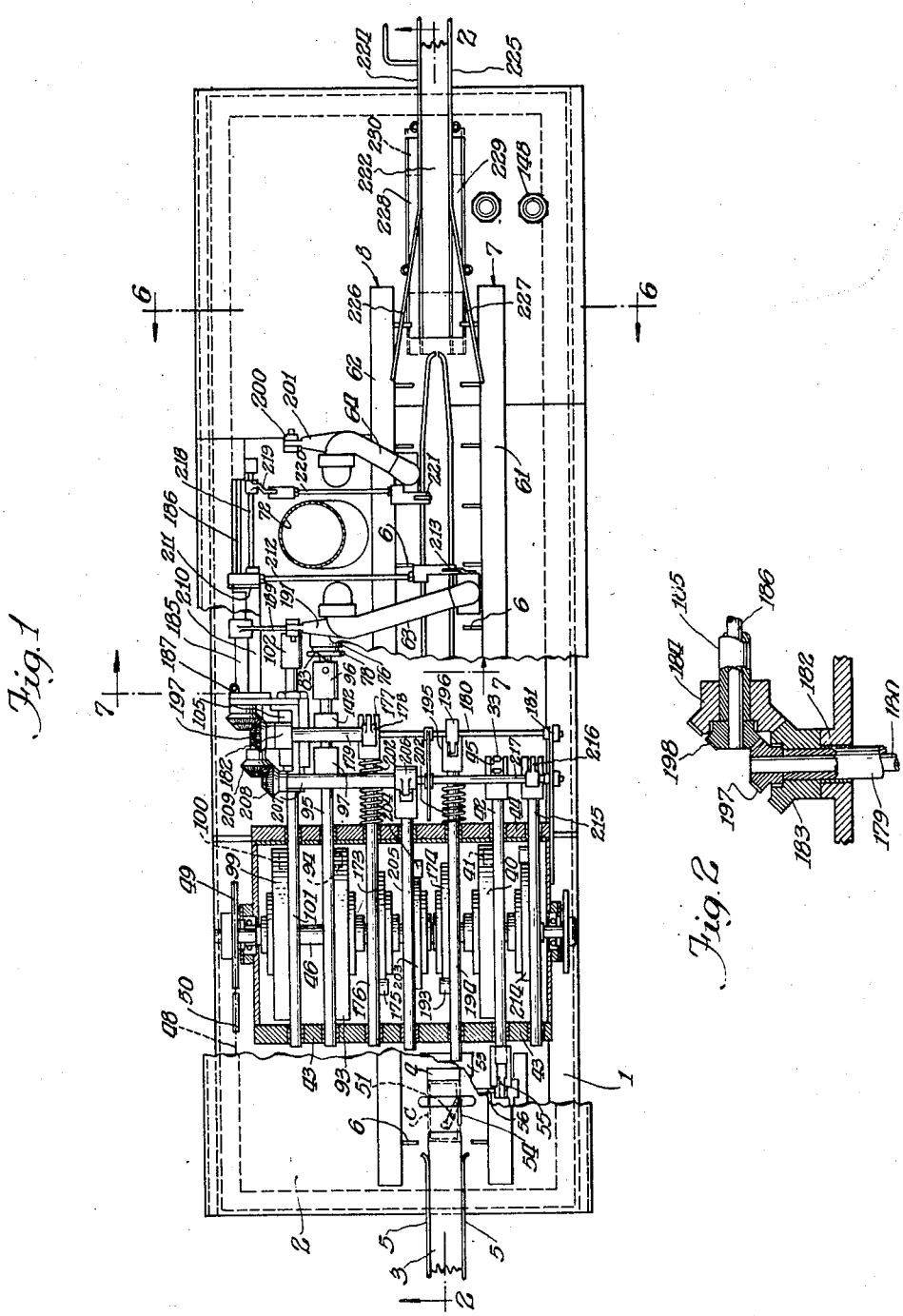
Inventor:
Harold A. Stine
By: Soans, Pond & Anderson
Attys

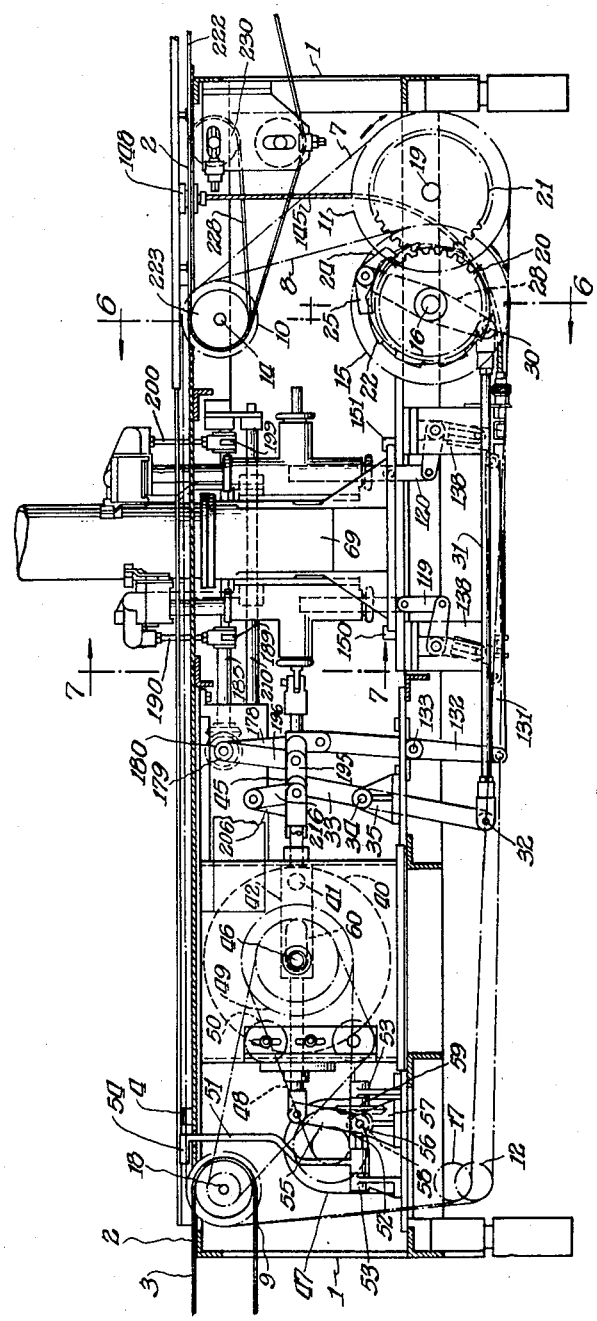

Feb. 6, 1951 — H. A. STINE — 2,540,557
MECHANISM FOR PACKAGING CHEESE AND OTHER VISCOUS MATERIALS
Filed Oct. 18, 1947 — 6 Sheets-Sheet 3

Inventor:
Harold A. Stine

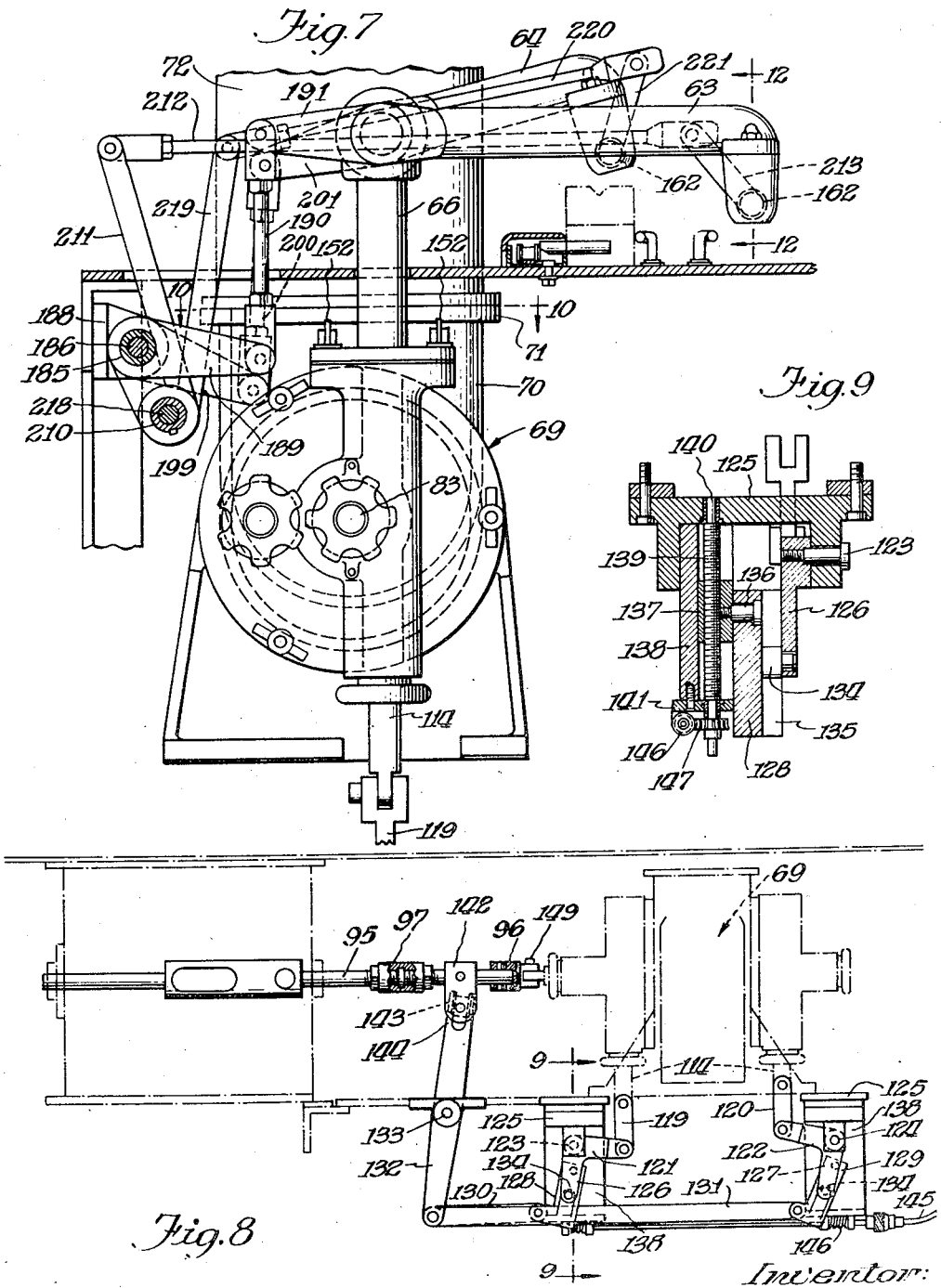

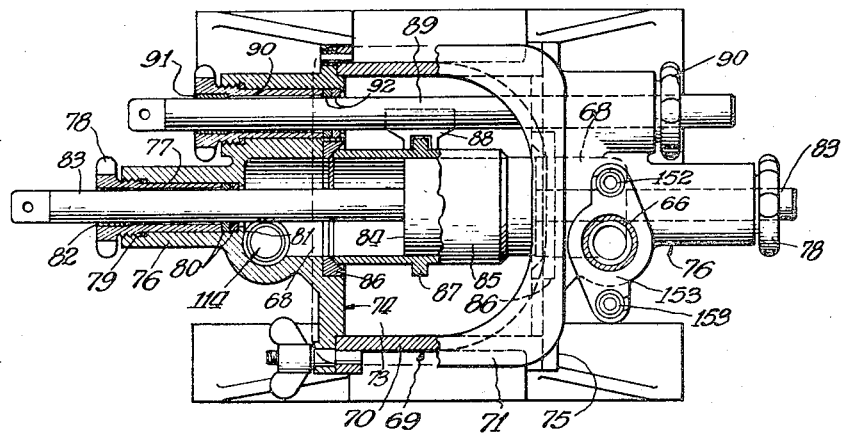
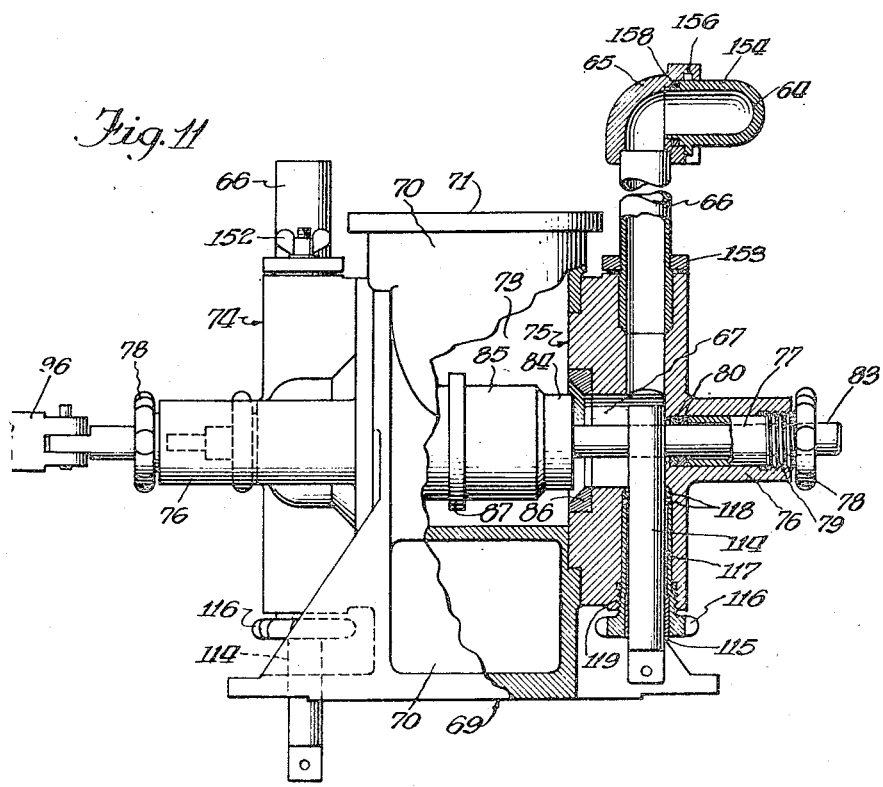

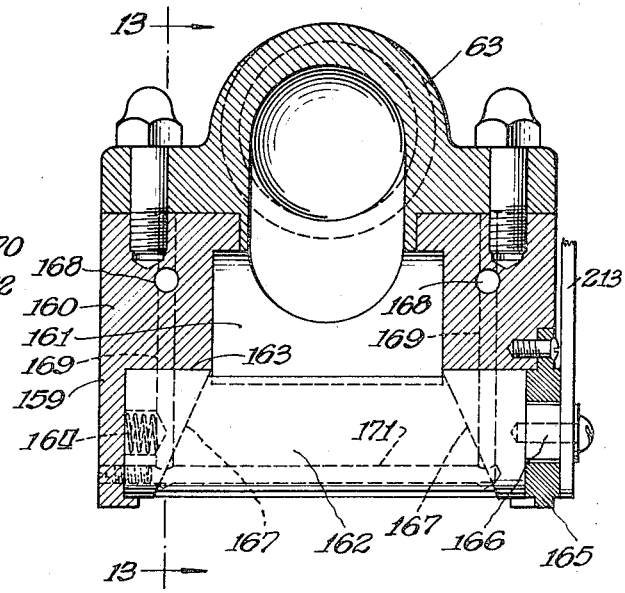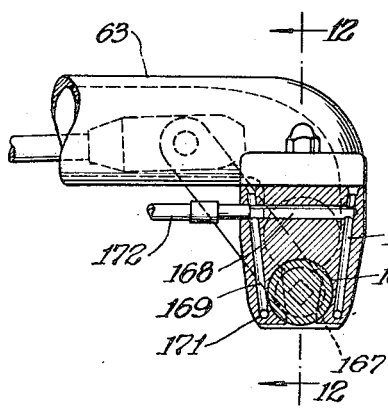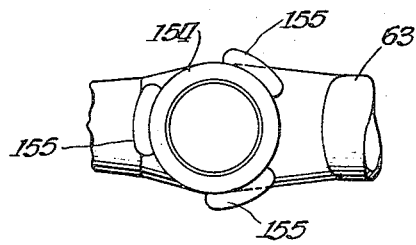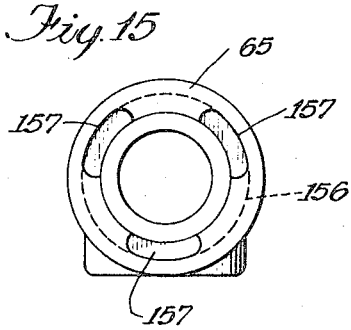

Patented Feb. 6, 1951

2,540,557

UNITED STATES PATENT OFFICE 2,540,557

MECHANISM FOR PACKAGING CHEESE AND OTHER VISCOUS MATERIALS

Harold A. Stine, Fontana, Wis., assignor to Kraft Foods Company, Chicago, Ill., a corporation of Delaware Application October 18, 1947, Serial No. 780,706

13 Claims. (Cl. 226—95)

1

This invention relates to improvements in mechanism for packaging cheese and other viscous materials, and the main objects of the invention are to provide mechanism which will be operative to both rapidly and accurately fill receptacles with a predetermined amount of material; to provide such mechanism which will be easy to keep in a clean and sanitary condition; to provide mechanism of the character indicated which will be substantially trouble free notwithstanding its high speed container filling capacity; and to provide such mechanism of the attractive clean-cut appearance which will lend itself to exhibition to consumers and others who make a practice of visiting production plants, especially plants where food products are prepared and packaged.

Other objects and advantages of the invention will be understood by reference to the following specification and accompanying drawings (6 sheets) wherein there is illustrated a machine embodying a selected form of the invention as designed for the packaging of cheese in containers. It should be understood that although reference is here made to the packaging of cheese, it is not thereby intended to restrict the scope of this invention to machines for cheese packaging, and that reference to that specific material is merely exemplary.

In the drawings:

Fig. 1 is a top plan, certain parts being broken away to reveal certain details of mechanism appearing below the top of the mechanism;

Fig. 2 is a sectional illustration of an element of mechanism which appears in elevation and on a small scale in Fig. 1;

Fig. 3 is a longitudinal section approximately on the line 2—2 of Fig. 1;

Fig. 4 is a detail illustration of a unit of mechanism which appears in elevation in Fig. 1;

Fig. 7 is a partial cross section approximately on the line 7—7 of Figs. 1 and 3;

Fig. 8 is an illustration of certain linkage employed for actuating certain parts of the machine;

Fig. 9 is a section approximately on the line 9—9 of Fig. 8;

Fig. 10 is a top plan of a part of the mechanism appearing in Fig. 7, the plane of the Fig. 10 plan being represented by the line 10—10 of Fig. 7, portions of the mechanism being broken away in Fig. 10 to reveal certain details;

Fig. 11 is a side elevation of the pumping unit of mechanism shown in Figs. 7 and 10;

Fig. 12 is a section through a filling nozzle approximately on the line 12—12 of Figs. 7 and 13;

Fig. 13 is a section on approximately the line 13—13 of Fig. 12, and

Figs. 14 and 15 are elevational views of a detachable connection which is employed between the filling spout arms and the conduits from which material is fed into the filling spouts.

Figure 5:
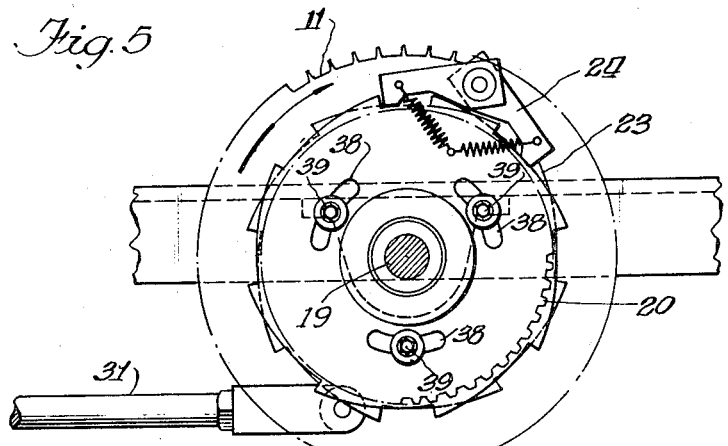
Fig. 5 is a side elevation of a unit of mechanism which appears on a smaller scale in Fig. 3, Fig. 5 being also a section on the line 5—5 of Fig. 6.

The mechanism illustrated in the drawings comprises a supporting frame, all parts of which are designated 1 in the drawings except to the extent that any special parts may hereinafter be specially referred to. The frame supports a top plate 2 which may be of stainless steel sheet metal and the sides of the apparatus may be closed with similar sheets or otherwise, if desired. The units of mechanism are, in general, located within an enclosure so formed around the frame structure 1.

Open-topped trays or similar containers of paper board or other material are delivered to the machine on a conveyor belt, a portion of which is represented at 3, said conveyor belt being driven continuously and the trays advancing continuously with the conveyor to the extent permitted by a stop 4 which is secured to the surface of the top plate 2. Suitable side guides 5—5 (Fig. 1) serve to guide the containers during their travel on the conveyor 3 so as to maintain them lengthwise on the conveyor for delivery in square position against the stop 4. The containers, one of which is represented at C in dotted lines, are fed alternately in opposite directions from the initial position against stop 4 so as to be delivered into the path of pusher fingers 6, which project laterally from conveyor chains 7 and 8 which travel over the table plate 2. The conveyor chains 7 and 8 constitute conveyors for separate container filling lines, the mechanism having two such lines, each of which advances the cartons step by step, one of the conveyors being at rest during a container filling operation while the other conveyor is in movement to deliver a container to the filling position of that particular line.

Figure 6:
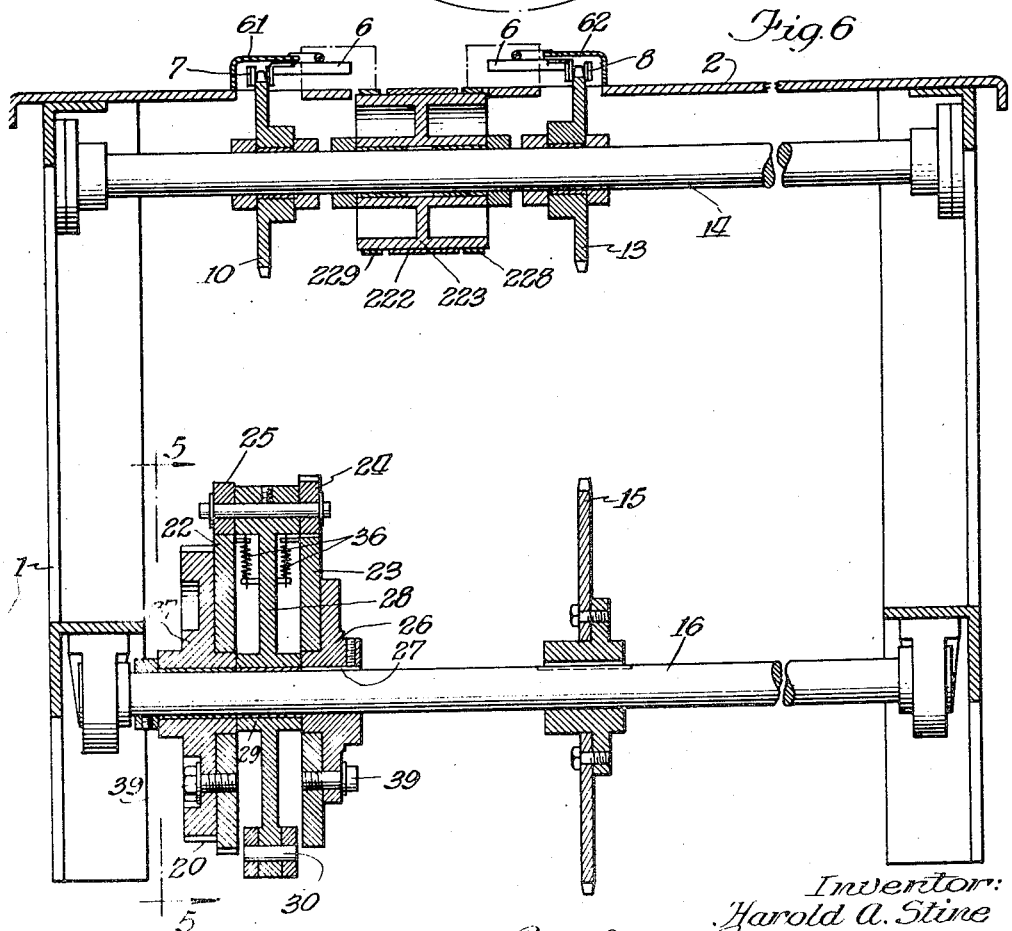
Fig. 6 is a cross section approximately on the line 6—6 of Figs. 1 and 3.

The details of such conveyors are well known in the art wherefor said conveyors are only diagrammatically represented in Fig. 3. The conveyor 7 is guided (see Figs. 1 and 6) by sprockets represented at 9, 10, 11, and 12. The conveyor 8 is similiarly guided around sprockets, one of which is coaxial with the sprocket 9 and rotatably mounted on the same shaft as said sprocket 9, a sprocket 13 which is coaxial with and rotatably mounted on the shaft 14 which also supports the sprocket 10 of the conveyor 7, a sprocket 15 which is secured to a shaft 16 and a sprocket 17. The sprocket 9 for the conveyor 7 and the corresponding sprocket for the conveyor 8 are rotatably mounted on a shaft 18 which also has secured to it a pulley for the conveyor belt 3. The said shaft 18 is suitably journaled in the frame structure 1. The shaft 14 which rotatably supports the sprockets 10 and 13 is also suitably mounted in the frame structure substantially as represented in Fig. 6. The sprockets 12 and 17 are idlers and they are suitably mounted for vertical adjustment for conveyor tightening purposes in accordance with conventional practice.

The sprocket 15 is keyed to the shaft 16 which is suitably journaled in bearings carried by the frame structure as represented in Fig. 6, and said shaft 16 is intermittently rotated step by step by mechanism which will presently be described. The shaft 19 which carries the sprocket 11 for the conveyor 7 is also driven step by step from the shaft 16, through the agency of intermeshing gears 20 and 21 carried respectively by the shafts 16 and 19.

The mechanism for actuating the conveyors 7 and 8 comprises a pair of ratchet wheels 22 and 23, these ratchet wheels respectively having oppositely faced ratchet teeth for cooperation with oppositely facing pawls 24 and 25. The pawl 24 is operative on the ratchet 23 to drive the shaft 16, the sprocket 15 and the conveyor 8. The ratchet 23 is adjustably secured to a flanged mounting hub 26 which is keyed as indicated at 27 to the shaft 16. Hence step by step movement imparted to the ratchet 23 will be imparted to such shaft 16 and the sprocket 15 of the conveyor 8. The pawl 25 acts on the ratchet 22 to which the gear 20 is secured.

The pawls 24 and 25 are pivoted to one end of a lever 28 which is journaled intermediate its ends as shown at 29 on the shaft 16. The opposite end of said lever is pivoted as indicated at 30 to one end of a long link 31, the other end of which is pivoted as shown at 32 to the lower end of a lever arm 33 which is pivotally mounted intermediate its ends as shown at 34 on a bracket 35 which is suitably supported from the structure of the frame 1.

The lever arm 33 is rocked about its pivot 34 by cam means which will presently be described, so that the lever 28 of the ratchet mechanism is correspondingly rocked about the axis of the shaft 16. During the movement of the lever 29 in one direction, the pawl 24 actuates the ratchet 23 and the pawl 25 rides idly over the teeth of the other ratchet 22. During the opposite movement of the arm 28 the pawl 25 drives the ratchet 22 while the pawl 24 rides idly over the teeth of its ratchet 23. The pawls may be spring-held in engagement with the teeth of the ratchet by suitable spring means as indicated at 36, one end of each spring 36 being anchored to the lever 28 and the other ends of said springs being respectively anchored to the pawls.

The ratchet wheel 22 is rotatably adjustably mounted on and secured to a flanged mounting hub 37 which has its flange extended and provided with gear teeth to form the above mentioned gear 20.

The rotatably adjustable mounting of the ratchets 22 and 23 on their respective mounting hubs 26 and 37 is effected by providing the hubs with arcuate slots, such as represented at 38 (Fig. 5) through which the fastening bolts 39 pass to threadedly engage properly tapped holes in the respective ratchets 22 and 23.

By providing the intermeshing gear drive between the shafts 19 and 16 and driving the conveyor 8 from the shaft 16 while the conveyor 7 is driven from the shaft 19, both conveyors are driven step by step in the same direction by means of the single ratchet actuating arm 28, oppositely directed strokes of the arm being made work strokes. Separate drives for the two conveyors are thereby avoided with attendant simplification of the structure.

The lever arm 33 is rocked by means of a rotary box cam 40 (Figs. 1 and 3) which acts against a roller 41 carried by one side of a cam arm 42 which is slidably mounted near its opposite ends in suitable bearings provided in cross members 43 and 44 which are suitably mounted on or in effect, constitute parts of the frame structure 1. One end of said cam arm 42 is connected by a pivot to the upper end of the arm 33 which is forked as indicated at 45 to receive the connecting pivot.

The cam 40 is secured to a main cam shaft 46 which is driven continuously by means of a suitable chain or belt drive from an electric motor 47 which may be mounted on the frame structure as represented in Fig. 3. The driving chain indicated diagrammatically at 48 in Figs. 1 and 3, engages a motor sprocket, a sprocket 49 on the shaft 46 (see Fig. 1) and an idler sprocket 50 which is suitably adjustably mounted so as to facilitate adjustment of the tautness of the driving chain 48.

The cam rod 42, which is connected as aforesaid to the ratchet mechanism for actuating the conveyors 7 and 8 has its other end connected to mechanism for shifting the incoming empty containers from the delivery belt 3 to the respective conveyors 7 and 8. This shifting mechanism, as best shown in Figs. 1 and 3, comprises an arm 51 which is secured at its lower end to a shaft 52, the latter being suitably journaled in bearing brackets 53—53 which are mounted on the frame structure 1. The upper end of said arm 51 is provided with a laterally extending pusher head or plate 54 which is operative immediately above the table surface 2 to engage the sides of the incoming packages and to shift them alternately in opposite directions from the incoming line to the respective conveyors 7 and 8.

The indicated rocking movement of the shifter arm 51 is produced by connecting the said other end of the cam rod 42 to an arm 55 which is secured to a shaft 56, the latter being suitably journaled in brackets such as represented at 57, which are supported by the frame structure 1. The shaft 56 has mounted on it a bevel gear 58 which meshes with a bevel gear 59 on the shaft 52. Oscillating movement imparted to the shaft 56 through the agency of the cam rod 40 and the lever 55 is transmitted to the shaft 52 and the container shifter arm 51. As represented in Fig. 3, the cam rod 40 is slotted as indicated at 60 to be slidable over the cam shaft 46, this construction being also embodied in other cam actuated rods, similar to the rod 40, which will presently be referred to.

The conveyors 7 and 8 which propel the containers through the mechanism are not required to support any significant weight except their own weight and the weight of the pushers 6. These conveyors may slide over the surface of the table top 2 except to the extent that they may be held clear of the table top by their engagement with the guiding sprockets, such as 9 and 10. These conveyor chains are substantially concealed by means of angle-shaped covers 61 and 62 which may be detachably mounted on the table structure in any suitable manner so as to permit their being removed to afford access to the chains when desired. The container pushers 6 project toward each other from the respective chains under the said hoods or covers 61 and 62 so that only portions of said pushers 6 are normally visible, as represented in Fig. 1.

For filling the packages, two filling spouts 63 and 64 are provided, the filling spout 63 serving the containers advanced by the conveyor 7 and the filling spout 64 serving the containers fed by the conveyor 8. These filling spouts 63 and 64 together with their operating mechanisms and filling valve heads are of substantially like construction except that one is longer than the other, as represented in the drawings and one being disposed at an angle opposite to the angular disposition of the other. Except for the differences indicated, the following explanation of the filling heads and the mechanism for feeding material through said spouts and heads will apply to both heads although specifically given in respect of the longer spout 63.

The spouts 63 and 64 communicate through suitable elbows 65 and conduits 66 with pressure chambers 67 and 68 respectively of a pump mechanism referred to in its entirety by the reference numeral 69 (see Figs. 7, 10 and 11).

The pump structure 69 embodies a main or central body part 70, the upper end of which is provided with a flange 71 for facilitating connection thereto of a delivery conduit or standpipe 72 which communicates with a receptacle usually located on the floor above into which molded cheese (or other viscous material) is delivered. The viscous material flows downwardly in the standpipe 72 and is delivered into the main chamber 73 of the pump body. The opposite sides of said pump body are closed by side members which are of substantially like construction except that one is right hand and the other left hand, these side members being designated 74 and 75 respectively. These side members 74 and 75 are detachably secured to the respective sides of the central body 70 by bolts and wing nuts as shown in Fig. 10, or in any other approved manner. Each of the members 74 and 75 is provided with a laterally extending elongated cylindrical boss 76 into which is removably fitted an elongated sleeve or gland 77. The sleeve 77 is provided with a hand wheel formation 78 for facilitating manipulation thereof, suitable screw threading indicated at 79, being provided for facilitating inward adjustment of the sleeve incident to turning thereof through the agency of said hand wheel 78. The inner end of the bushing is arranged to compress suitable packing rings 80 which are seated against an inner end flange portion 81 integral with the end members 74 and 75. The outer end of the sleeve or gland 77 is provided with a housing 82. The sleeves 77 of the respective end members 74 and 75 slidably support a shaft 83 which carries an enlarged piston 84 within the main chamber 73. Said piston 84 is reciprocated by suitable mechanism which will presently be described and said piston has slidably mounted on it a sleeve 85, the opposite ends of which are suitably chamfered for cooperation with correspondingly angled faces of valve seat rings 86—86, which are seated in the inner walls of the respective end castings 74 and 75. The cheese (or other material) in a viscous state is delivered into the main chamber 73, filling the space around the sleeve 85, the piston 84 and entering into the pressure chambers 67 and 68 when permitted to do so by the position of the piston 84.

The valve sleeve 85 is provided intermediate its ends with an outwardly projecting annular flange 87 for cooperation with a shifter fork 88, which is secured to a shaft 89. The shifter fork 88 is preferably formed to extend about half way around the sleeve 85, preferably equal distances in opposite directions from the shaft 89. The shaft 89 is slidably mounted in the end members 74 and 75 of the structure through the agency of removable packing glands 90—90 which have bearing bushings 91 in their outer ends as represented in Fig. 10. The glands 90 act on packing rings 92 to prevent leakage of material from the pump chamber 73 around the shaft 89.

The piston 84 of the pump structure is reciprocated by means of a box cam 93 (Fig. 1) which acts on a roller 94 carried by a cam actuated rod 95. The rod 95 is slidably mounted in suitable bearings carried by the transverse members 43 and 44 and it is connected through the agency of a clevis 96 and adjustable connector 97 to the piston rod 83. The box cam 94 is, of course, secured to the cam shaft 46 so as to be thereby positively rotated, and said cam acts to positively reciprocate said piston 84 in properly timed relation to the other elements of the mechanism.

The piston sleeve 85 is reciprocated through the agency of the slidable shaft 89 by connections to a box cam 99 which is also fixed to the cam shaft 46. Said box cam 99 acts on a roller 100 which is carried by a rod 101, which is slidably mounted in suitable bearings in the transverse members 43 and 44 of the frame structure. Said rod 101 is connected by suitable clevis arrangement 102 to the sleeve rod 89 so as to enable said cam 99 to actuate said sleeve in the required timed relation to the other operating movements.

It will be seen that when the parts are in the position illustrated in Fig. 10, the piston 84 may be moved to the left to force the material in the pressure chamber 28 and in the sleeve portion to the left of the piston into the outlet conduit 66 of the left hand end member 74 which conducts the material to the package filling spout 63.

During the movement of the piston 84 from the position illustrated in Figs. 10 and 11 to the left within the sleeve 85, the cheese or other material in the chamber 73 will, of course, follow the piston into the right hand end portion of the sleeve so as to fill said portion while also entering the pressure chamber 67 in the right hand end member 75 of the chamber structure. Upon completion of the delivery of a charge of material through the conduit 66 and filling head 63, the sleeve 85 is first shifted to the right into engagement with the valve seat 86 in the right hand end member 75. Then the piston 84 is moved to the right so as to force the cheese contained in the right hand end portion of the sleeve 85 and the pressure chamber 67 upwardly into the outlet conduit 66 and filling head 64.

The valve sleeve 85 should be tightly seated on the annular valve seats 86, but it should not be seated so forcefully as to dig into the respective valve seats or otherwise injure the same. To control the pressure with which the ends of the valve sleeve are seated on the annular valve rings, the pusher rod 101 which actuates the sleeve rod 91, is provided with a spring transmission arrangement, the details of which are shown in Fig. 4.

The rod 101 comprises two sections 101a and 101b. The rod section 101a has a threaded end portion 103 which is threaded into a suitably bored and tapped end portion 104 of a tubular member 105. The shaft section 101b is slidably supported in the housing member 105 by having its free end portion slidably mounted in a continuation of the tapped bore at one end of the housing, as indicated at 106, its opposite portion being slidably mounted in the nut 107 which is threaded into the adjacent open end portion of the tubular member 105 as shown at 108. A pair of springs 109 and 110 are disposed around the rod section 101b on opposite sides of a flange 111 which is rigid with the shaft section. Said springs are confined between the opposite sides of the flange 111 and the bottom 112 of the main recess of the tubular member 105 and the inner end 113 of the nut 107. It will be seen that movement of the rod section 101a to the right will be transmitted through the spring 109 and the flange 111 to the rod section 101b and to the sleeve actuating shaft 89. Hence seating of the sleeve end on the right hand valve ring will be cushioned by yielding of the spring 109. Similarly, movement of the cam actuated rod section 101a to the left will be transmitted through the nut 107 and spring 110 to the flange 111 and rod section 101b so that seating of the valve sleeve on the lefthand valve ring will be cushioned by the spring 110. The springs 109 and 110 are, of course, selected of such strength as to provide the required seating pressure between the valve sleeve and the respective valve rings.

In the food industry and in other industries where measured quantities of material are packaged for sale at specified prices, it is extremely important that the specified quantity of material be not less than the specified amount. In order to insure against short weights, it has become the more or less standard practice to deliver a slight surplus of material so that normally the package will be overweight and the chances of producing a short weight package greatly reduced, if not eliminated. This practice is, of course, costly to the manufacturer in that a considerable amount of surplus material is packaged and shipped without any billing to cover such surplus. This surplus and the cost involved counts up to a substantial amount in connection with any large volume business, and many attempts have been made to cut down the extent of the loss thus incurred.

In the present equipment there is provided what might be called micro-adjustable mechanism for varying the quantity of material discharged from the pumping unit for each discharge operation.

The micro-adjustable equipment comprises an auxiliary pump plunger 114, there being one such auxiliary pump plunger in each of the pump end members 74 and 75, such pump plungers being disposed in substantially axial alignment with the outlet conduit 66 of the respective end members. These auxiliary pump plungers 114 are slidably mounted in bushings 115 carried by the hand wheel end portion 116 of packing glands 117 which act on packing rings 118 at their inner ends to seal the pump piston 114 against leakage from the pressure chamber 67 or 68. As shown at 119, the packing glands are threaded into the respective end members 74 and 75 so that they may be adjustable inwardly and outwardly to control the sealing effected by the packing rings 118.

The auxiliary pump pistons 114 are automatically reciprocated in timed relationship with the movement of the main piston 84. The extent to which the respective auxiliary piston rods 114 are moved upwardly into the respective pressure chambers 67 and 68 serves to determine the total volume of material which will be fed out of the pump by each stroke of the main piston 84. If, for example, it is found that a pump is delivering a short weight of material, adjustments will be made to cause the auxiliary piston 114 to be moved somewhat farther into the pressure chamber 67 (or 68) whereby an additional amount of material will be fed from the chamber. If the weight of the material being discharged is found to exceed the required amount, the extent of movement imparted to the auxiliary pistons 114 will be reduced so that the inward movement of the pistons 114 will displace a correspondingly reduced amount of the material being fed.

The mechanism for operating the auxiliary pistons 114 and for adjusting their travel is shown in Figs. 1, 3, 8 and 9. As there shown, the auxiliary pump pistons 114 are connected at their lower ends by means of links 119 and 120 respectively to the free end of the horizontally extending arms 121 and 122 respectively of bell cranks which are in turn pivoted as indicated at 123 and 124 on fixed pivots provided in bracket members 125—125, which are carried by the frame structure (see especially Fig. 9). The bell cranks also have depending arms 126 and 127 respectively which are respectively adjustably connected to extension arms 128 and 129. The lower ends of the arms 128 and 129 are respectively connected by short and long links 130 and 131 to the lower end of a rock lever 132, which is pivoted intermediate its ends in a suitable supporting bracket, as indicated at 133. Rocking motion of the lever 132 about its pivot 133 will, of course, be transmitted by links 130 and 131 to the respective bell crank arms 126 and 127 and the respective arms 121 and 122 to the links 119 and 120 and the respective auxiliary pump rods 114.

The extent of rocking movement imparted to the bell crank arms 121 and 122 and the respective pump rods 114 is, of course, initially determined by the extent of rocking movement imparted to the arm 132. However, the adjustable connection between the bell crank arms 126 and 127 and the respective extenders 128 and 129 permits adjustment of the effective length of the bell crank arms 126 and 127 and hence of the vertical movement imparted through the bell crank arms 121 and 122 to the respective pump rods.

The adjustable connection between the arms 126 and 127 and their respective extenders 128 and 129 is of the character shown in detail in Fig. 9 in respect of the bell crank arm 126 and its extender 128. As there shown, the depending bell crank arm 126 carries a pivot roller 134 which is slidable in a guideway or slot 135 formed in and extending lengthwise of the extender arm 128. The arm 128 is pivoted near its upper end, as indicated at 136, on a bearing block 137 which is vertically adjustably mounted in a guideway formed in a fixed post 138 which depends from the bracket 125. The pivot block 137 is provided with a threaded opening through which an adjusting screw 139 is threaded. Said adjusting screw 139 is rotatably mounted at its upper end in the bracket 125 as shown at 140, and at its lower end in a member 141 which is rigidly secured to the lower end of the post 138. The screw 139 is held against endwise movement between the lower surface of the bracket 125 and the upper surface of the member 141 so that upon rotation of the screw the pivot block 137 will be adjusted up or down, depending upon the angle of the screw threading and the direction of turning of the screw. Such up or down movement of the pivot block 137 will serve, of course, to adjust the extender arm 128 up or down relative to the pivot 123 of the bell crank arm 126 with corresponding adjustment of the throw of said bell crank incident to the rocking motion transmitted thereto by the described link connections. Motion is, of course, transmitted from the extender arm 128 to the bell crank arm 126 through the agency of the roller 134.

Rocking movement is imparted to the arm 132 by means of a connection to the push rod 95 which actuates the main pump piston, this connection consisting of a clevis 142 which is fixedly secured to a portion of the pusher rod 95. Said clevis extends downwardly from the pusher rod and carries a pivoted block 143 which fits slidably in the forked upper end portion 144 of said arm 132. Reciprocation of the cam rod 95 will, of course, actuate the lever 132 and thereby the auxiliary pump rods.

The packages, after being filled, are of course subject to inspection and weight checking either as an independent manual operation or by means of weight checking equipment. Adjustment of the adjustable bell crank arm structure, which controls the throw of the respective auxiliary piston rods 114 may be made manually or automatically in connection with automatic checking of the weight. For present purposes, provision is shown for effecting manual adjustment. Such adjustment may be effected through the agency of suitable flexible shafts, one of which is indicated at 145 and has its lower end suitably connected to a small worm gear 146 which is rotatably mounted in ears provided for that purpose on the member 141 (Figs. 8 and 9). The worm gear 146 meshes with a worm wheel 147 which is secured to the lower end of the screw 139 so that rotation of the worm gear 146 will effect turning of the screw 139 and adjustment of the effective length of the lever arm which controls the vertical movement of the auxiliary piston rods. The other end of the flexible shaft may be suitably mounted on the top plate 2 of the apparatus and provided with a dial and knob or similar means, such as indicated at 148 (Figs. 1 and 3), for facilitating manual turning of the flexible shaft and of the screw 139. The dial may be calibrated to indicate in ounces or fractions of an ounce the extent of adjustment in the weight of the delivered product which would be effected by any given turning of the knob.

The pump structure in its entirety is readily separable from the machine in general. The various operating rod connections may be broken by withdrawing pivot pins, such as clevis pin 149 (Fig. 8) and the corresponding clevis pin which connects the sleeve operating cam rod 101 to the sleeve shaft 89. The connection of the main conduit 72 to the flanged upper end 71 of the pump may embody a series of readily disengageable clamps disposed around the periphery of said flanges to permit separation at this point and the base of the pump may be slidably mounted on the frame structure between opposite guide bars indicated at 150 and 151 (Fig. 3) which are secured to the frame structure of the machine. If desired, one or more readily removable locating pins or screws may be passed through either or both of the guides 150 and 151 and through the base plate of the pump structure to prevent accidental shifting thereof transversely of the machine. Other arrangements for holding the pump structure in relatively fixed operative position in the machine may, of course, be employed. The outlet conduit 66 may be detachably secured by means of wing nuts or bolts, such as indicated at 152 (Fig. 7) and a clamping plate 153 which may be rotated about the conduit to be disengaged from the clamping nuts when desired. As best shown in Fig. 11, the conduit 63 is suitably shouldered so that clamping plate 153 will hold the conduit down when the plate is pulled down through the agency of the clamping nuts 152.

The connection between the respective spouts 63 and 64 and the elbows 65 by which they are connected to the discharge conduit 66 is of an easily detachable character. For example, it may be of a bayonet type connection in which the hub portion 154 of the spout is provided with a plurality of circumferentially spaced ears 155 which are adapted to enter an annular groove 156 in the adjacent end portion of the elbow 65. Entrance passageways 157 are, of course, provided to permit insertion and removal of the bayonet joint members 155 from the annular recess 156. To prevent leakage at the joint between the spout arms and the elbows, packing rings indicated at 158 (Fig. 11) may be interposed between suitably formed shoulders in the spout arms and the elbows, such packing being subject to the required compression by the bayonet joint just described.

The delivery ends of the spouts are provided with elongated and valved nozzles 159 (see Figs. 12 and 13). These nozzles include a main casting or block 160 which is secured by screws or bolts as shown in Fig. 12, to the free end of the spout arm, the latter being equipped with suitable ears for that purpose. The head castings 160 are hollow as indicated at 161 and rotary valve cores 162 are mounted in the opposite end portions of the nozzle heads. For that purpose the nozzle heads are suitably bored out from one side as indicated at 163, to rotatably receive the valve core 162. A compression spring 164, preferably recessed into one end of the valve core serves to yieldingly maintain the valve core against endwise shifting and against a mounting plate element 165 which is secured to the opposite end of the head 160 to provide a bearing for the reduced diameter shaft portion 166 of the core. The valve core 162 is transversely slotted as indicated at 167, to permit the discharge of material from the spout arm 63 when said slot is in register with the hollow chamber 161 of the discharge nozzle. The passage of material out of the spout may, of course, be stopped by turning the valve core 162 so as to disconnect the passageway 167 thereof from the chamber 161.

When the equipment is employed for filling containers with cheese or other thermoplastic material, it is advantageous to provide temperature control for the nozzle to prevent the chilling and setting of material on the nozzle. The preservation of cleanliness is thereby facilitated. For that purpose, the nozzle head 160 is at each end drilled transversely as indicated at 168 near its upper end and downwardly from its upper end as indicated at 169 and 170 near its front and back sides. The passageways 169 at opposite ends of the head are further interconnected by means of a drilled passageway 171 near the lower end of the nozzle head. The passageways 170 are similarly interconnected. Flexible conduits, such as indicated at 172, may be connected to the open ends of the transverse conduits 168 at the back side of the head so as to circulate steam or hot water through the said passageways. In some instances it may be desirable to circulate a cooling medium which may be done, if desired.

The rotary valve cores 162 of the respective nozzles are automatically opened and closed in timed relation with rocking motion which is imparted to the spouts to lower and raise the discharge nozzles into and out of the container.

The raising and lowering movement of the long spout 63 is effected by a cam 173 (see Fig. 1) and the raising and lowering movement of the short spout 64 is controlled by a similar cam 174. The cam 173 acts on a roller 175 carried by a cam rod 176 which is horizontally slidably mounted in suitable bearing openings in the transverse members 43 and 44. At its forward end, the cam rod is provided with a clevis 177 which is connected to the lower end of an arm 178 (see also Fig. 3) which is secured to and depends from a tubular shaft 179 which is rotatably supported on a transverse shaft 180. The shaft 180 is journaled in a suitable frame supported bearing, such as indicated at 181 (Fig. 1) and through the agency of the tubular shaft 179 in a frame supported bearing 182 (see Fig. 2).

The tubular shaft 179 is rotatable around the shaft 180 and independently thereof, and it is provided at one end with a bevel gear 183 which meshes with a bevel gear 184 mounted on the adjacent end of another tubular shaft 185. The tubular shaft 185 encloses a smaller shaft 186 and these two shafts are supported one within the other in suitable frame supported bearings, such as indicated at 187 and 188 (Figs. 1 and 7).

The tubular shaft 185 has secured to it an arm 189, the free end of which is connected by means of an adjustable link 190 to the end of an arm 191, which is formed integrally with the spout 63. It will be seen that rocking movement imparted by the cam 173 to the tubular shaft 179 and thence to the tubular shaft 185 will also be imparted through the arm 189 and the link 190 to the long spout 63 to effect said up and down movement of its nozzle end with reference to the package into which it is to deliver material.

The shaft 180 which is rotatable within the tubular shaft 179 is actuated by action of the cam 174 on a roller 193 which is carried by the cam rod 194. The cam rod 194 is slidably mounted like the other cam rods and it is connected by means of a clevis 195 and an arm 196 to the shaft 180. Said shaft 180 is provided with a bevel gear 197 which meshes with a bevel gear 198 on the shaft 186 which is rotatable within the tubular shaft 185. The shaft 186 extends beyond the arm 189 through which the long spout is raised and lowered and has secured to it at the proper point an arm 199 which is similar to the arm 189. Said arm 199 is connected by an adjustable link 200 to the extension arm 201 of the short spout 64. Rocking movement resulting from the action of the cam 174 on the cam rod 194 thus effects raising and lowering of the short spout arm. Springs such as indicated at 202 (Fig. 1) disposed around portions of the cam rods 176 and 194 between their respective end clevises and the transverse member 44 serve to resiliently maintain the respective cam rollers 174 and 193 in engagement with the cams 173 and 174. The arrangement is such that the cam effects lowering of the nozzle against the resistance of the spring 202 while the spring elevates the nozzle as permitted by the cam.

The valve cores 162 of the respective nozzles are actuated by similar cam and tubular shaft arrangements. The valve core 162 of the long spout nozzle 163 is rotated from closed to open position and vice versa by means of a cam 203 which acts on a roller 204 carried by a cam rod 205 which, like the other cam rods, is slidably mounted in transverse members 43 and 44. Said cam rod 204 is connected by means of a clevis to the lower end of an arm 206 on a tubular shaft 207 which is equipped with a bevel gear 208 for transmitting rotation to a similar bevel gear 209 and a tubular shaft 210. The tubular shaft 210 has secured to it an arm 211 which is connected by means of a link 212 to an arm 213, which is rigidly attached to the valve core 162 of the long spout nozzle 63. Similarly the valve core of the short spout 64 is operated by means of a cam 214 acting through a cam rod 215, and arm 216 to rock the shaft 217. The shaft 217 rotates within the tubular shaft 207 and through beveled gears of the character already explained, transmits rotation to a shaft 218 which is rotatable within the tubular shaft 210. The shaft 218 has secured to it an arm 219 which is connected by means of a link 220 to the lever arm 221 of the valve core 162 of the short spout 64.

Suitable springs (not shown) may be interposed between any suitable parts or stretched between suitable parts to maintain operative engagement between the cams 203 and 214 and their respective cam rod rollers so as to insure operation of the valves in accordance with the formation of the cams.

After the containers have been filled, they are advanced step by step. They are ultimately delivered in line to a conveyor 222 which extends from the filling apparatus herein disclosed to top sealing or closing apparatus with which the present application is not concerned. The conveyor 222 has one end portion supported in the structure of the present machine on a wide roll 223 which is carried by the shaft 14 (see Figs. 1, 3, and 6). It will be remembered that the packages are alternately advanced in the two conveyor lines so that they are alternately fed to the receiving end of the discharge conveyor 222. Guide rods 224 and 225 are provided on opposite sides of the conveyor 222 to guide the packages on that conveyor, and the receiving end portion of said guide rods are flared as indicated at 226 and 227 respectively to provide an entrance mouth for receiving the packages from the opposite filling lines. To facilitate the delivery of the packages from the opposite filling lines, short auxiliary feed belts 228 and 229 are associated with the receiving end of the conveyor 224. These conveyor belts 228 and 229 are supported on the opposite end portions of the pulley 223 and on a suitably journaled pulley 230 which is horizontally adjustably mounted so as to facilitate maintenance of the belts 228 and 229 in taut condition.

The described apparatus provides a self-contained filling machine having a substantially smooth and unbroken exterior surface treatment, all operating mechanism being substantially concealed within the frame structure and side plates and the top plate which are secured to the supporting frame. The alternate operation of the feed lines and of the pumping mechanism serves to provide a more or less continuous operation which utilizes both forwardly and rearwardly directed forces of many of the operating elements of the mechanism. This results in simplification and ease of operation together with increased speed and general simplication which are highly desirable in apparatus of this kind.

The apparatus may be modified in many respects while retaining the principles of the invention.

I claim:

1. Apparatus of the class described, comprising a frame structure, a conveyor for propelling receptacles to be filled, a filling spout movable into and out of the container, valve means for controlling the flow of material out of said spout and into the container, a pump for delivering material through said spout to the container, a rotatably driven cam shaft, a plurality of rotatable cams carried by said cam shaft for respectively actuating said conveyor, said filling spout, said filling spout valve, and said pump.

2. Apparatus of the class described comprising a supporting frame, a pair of parallel conveyors for respectively conveying separate lines of containers, conveyor for delivering containers in a single line to the apparatus, means for laterally shifting containers from said single line of delivery alternately to said parallel conveyors, a rotatable cam, and means actuated by said cam for actuating said container shifting means and for alternately advancing said pair of conveyors.

3. In apparatus embodying a pair of parallel conveyors for alternately advancing articles in the same direction in parallel lines of travel, said means comprising a pair of ratchet wheels respectively having oppositely facing teeth, an arm mounted for movement alternately in opposite directions, a pair of pawls carried by said arm and respectively operatively associated with said pair of ratchets, means for alternately actuating said arm in opposite directions, thereby to alternately actuate said ratchet wheels in opposite directions, a shaft journaled for rotation and having one of said ratchet wheels freely rotatably mounted thereon and the other of said ratchet wheels secured thereto so as to effect rotation of said shaft, means for transferring rotation from said shaft to one of said pair of conveyors, and means for transferring rotation from the ratchet wheel which is rotatable on said shaft to the other of said conveyors.

4. In apparatus of the class described, a conveyor, means for actuating said conveyor step by step, said conveyor being provided with means for propelling a container, a filling spout having a nozzle at one end and mounted at its other end for rocking movement of said nozzle toward and from a container carried by said conveyor, means for delivering material under pressure to said spout, a valve in said nozzle for controlling the discharge of material from said spout, a cam shaft, a pair of cams carried by said cam shaft, and means actuated by said cams for respectively rocking said spout on its pivot mounting and opening and closing said nozzle valve.

5. Apparatus of the class described, comprising a pair of substantially parallel conveyors for propelling containers along parallel paths, means for alternately acuating said conveyors, a pair of filling spouts respectively associated with said conveyors for filling the containers propelled thereby, each of said spouts having one end pivotally mounted and provided at its other end with a discharge nozzle, said pivot mounting of the respective spouts permitting the nozzle ends thereof to be moved toward and from the respective containers to be filled, means for alternately rocking said spouts on their pivot mountings comprising a pair of rotatably mounted shafts, one of which is a tubular shaft and the other of which is rotatable within said tubular shaft, means for alternately oscillating said shafts, lever and link connections between said shafts and the respective filling spouts for alternately moving the latter on their pivot mountings as an incident to said alternate oscillation of said shafts.

6. In package filling apparatus of the class described, a pump having a chamber for receiving material to be packaged and a pair of outlets, a pair of conduits connected respectively to said outlets for conducting material from the pump to containers to be filled, a pump cylinder axially shiftable within said pump chamber, a piston axially shiftable within said cylinder, means for independently shifting said cylinder and piston successively in the same direction, pressure chambers communicating with said receiving chamber, valve rings intermediate said pressure chambers and said main chamber and arranged to respectively cooperate with the opposite ends of said cylinder to shut off communication between said pressure chambers and said main chamber and to establish communication between the respective pressure chambers and the cylinder space on opposite sides of said piston, whereby said piston is operative upon its alternate strokes to deliver material alternately to said pump outlets.

7. In a filling machine of the class described, a pump having an outlet and a pressure chamber communicating with said outlet, piston means for forcing material into said pressure chamber and outlet, means for actuating said piston, an auxiliary piston movable into the stream of material flowing through said pressure chamber and into said outlet for cooperating with said piston to deliver material into said outlet, means for reciprocating said auxiliary piston, and means for adjusting the stroke of said auxiliary piston to thereby adjust the quantity of material forced into said outlet.

8. In a filling machine of the class described, a pump having an outlet and a pressure chamber communicating with said outlet, piston means for forcing material into said pressure chamber and outlet, means for actuating said piston, a cam actuated push rod connected to said first mentioned piston for reciprocating the same, connections between said push rod and said auxiliary piston for actuating said auxiliary piston, and means for adjusting the stroke of said auxiliary piston to thereby adjust the quantity of material forced into said outlet.

9. In a filling machine of the class described, a pump having an outlet and a pressure chamber communicating with said outlet, piston means for forcing material into said pressure chamber and outlet, means for actuating said piston, a cam actuated push rod connected to said first mentioned piston for reciprocating the same, connections between said push rod and said auxiliary piston for actuating said auxiliary piston, means for adjusting the stroke of said auxiliary piston to thereby adjust the quantity of material forced into said outlet, said adjusting means comprising a pivotally mounted bell crank having the free end of one arm connected to said auxiliary piston and having the free end of its other arm provided with a laterally projecting element, a lever pivotally mounted at one end adjacent the pivot mounting of said bell crank and extending in a direction approximating a parallel relationship to the last mentioned bell crank arm, said lever being provided with a guideway receiving said laterally extending element of said last mentioned bell crank arm, means for adjusting the pivot mounting of said lever toward and from coaxial alignment with the pivot mounting of said bell crank, said lever being connected to said push rod and transmitting motion to said bell crank, the extent of motion so transmitted being variable as an incident to adjustment of the pivot mounting of said lever relative to the pivot mounting of said bell crank.

10. Apparatus according to claim 8, wherein the means for adjusting the extent of movement imparted to said auxiliary piston comprises pivotally mounted bell crank having the free end of one of its arms connected to said auxiliary piston, the free end of the other arm of said bell crank being provided with a laterally extending element, a lever disposed in a position approximating parallelism with said last mentioned bell crank arm, a pivot block mounted for adjustment toward and from the pivot of said bell crank, means pivotally mounting said lever in said pivot block, said lever being connected to said push rod so as to be rocked on its pivot mounting and being provided with a guideway receiving said bell crank arm element whereby rocking movement of said lever is imparted to said bell crank, and means for adjusting said pivot block toward and from said bell crank pivot to thereby vary the extent of movement imparted by said lever to said bell crank.

11. In apparatus of the class described, a double acting pump for delivering material alternately to a pair of filling lines, said pump comprising a main chamber, reciprocable cylinder sleeve and piston members in said chamber, said piston being reciprocable within said sleeve, means for alternately reciprocating said sleeve and piston in opposite directions while effecting successive movement of said sleeve and piston in the same direction, a pair of pressure chambers respectively aligned with the opposite ends of said cylinder sleeve and communicating with said main chamber, valve rings intermediate said pressure chambers and said main chamber, said valve rings being respectively adapted to cooperate with the opposite ends of said sleeve to seal off communication between the respective pressure chambers and said main chamber to establish communication between the respective pressure chambers and the respective adjacent end portions of the cylinder sleeve, a pair of outlets respectively communicating with said pressure chambers, and a pair of members respectively associated with said pressure chambers and movable therein to supplement the material discharging action of said piston, means for automatically actuating said members for material discharging cooperation with said piston, and means for adjusting the stroke of the respective members to thereby adjust the quantity of material discharged through the respective outlets.

12. Apparatus of the class described, comprising a pair of conveyors for propelling receptacles along parallel paths, pump means for delivering material to said containers, a pair of spouts connected to said pump means for receiving material therefrom and respectively having discharge nozzles associated with the respective conveyors for delivering the material to the receptacles carried by said conveyors, said spouts having inlet ends spaced laterally in the same direction from one of said conveyors and one of said spouts bridging one of said conveyors to reach containers carried by the other conveyor, and means for receiving the filled containers from said conveyors.

13. Filling apparatus of the class described, comprising a pair of alternately intermittently actuated conveyors for propelling containers along approximately parallel paths of travel, means associated with the respective conveyors for filling the containers propelled thereby, a main receiving conveyor for receiving the filled packages from said pair of conveyors, said receiving conveyor being arranged in parallelism to said pair of conveyors and approximately midway between them, and a pair of auxiliary receiving conveyors respectively disposed adjacent the opposite sides of the receiving end portion of said main receiving conveyor to facilitate the delivery to said receiving conveyor of packages from the paths of the relatively laterally offset conveyors of said pair of conveyors.

HAROLD A. STINE.

REFERENCES CITED

The following references are of record in the file of this patent:

UNITED STATES PATENTS

| Number | Name | Date |
| --- | --- | --- |
| 950,975 | Watterson | Mar. 1, 1910 |
| 1,181,090 | Winkley | Apr. 25, 1916 |
| 1,307,898 | Daum | June 24, 1919 |
| 1,427,325 | Quick | Aug. 29, 1922 |
| 1,482,467 | Harrington | Feb. 5, 1924 |
| 1,555,008 | Harrington | Sept. 29, 1925 |
| 1,564,477 | Glass | Dec. 8, 1925 |
| 1,700,494 | Harrington | Jan. 29, 1929 |
| 1,804,772 | Hubbard | May 12, 1931 |
| 2,031,912 | Spear | Feb. 25, 1936 |